(12) United States Patent
McCaughey et al.

(10) Patent No.: US 11,088,440 B2
(45) Date of Patent: Aug. 10, 2021

(54) PROTECTIVE SCREEN OVERLAY WITH ANTENNA ELEMENT

(71) Applicant: Penumbra Brands, Inc., North Salt Lake, UT (US)

(72) Inventors: Ryan McCaughey, Encinitas, CA (US); Kevin Wolentarski, Encinitas, CA (US)

(73) Assignee: Penumbra Brands, Inc., North Salt Lake, UT (US)

( * ) Notice: Subject to any disclaimer, the term of this patent is extended or adjusted under 35 U.S.C. 154(b) by 10 days.

(21) Appl. No.: 16/510,485

(22) Filed: Jul. 12, 2019

(65) Prior Publication Data

US 2021/0013591 A1 Jan. 14, 2021

(51) Int. Cl.
*H01Q 1/24* (2006.01)
*G06F 1/16* (2006.01)
*H01Q 5/378* (2015.01)
*H01Q 1/36* (2006.01)

(52) U.S. Cl.
CPC ........... *H01Q 1/245* (2013.01); *G06F 1/1637* (2013.01); *H01Q 1/368* (2013.01); *H01Q 5/378* (2015.01)

(58) Field of Classification Search
CPC ............ H01Q 1/38; H01Q 1/40; H01Q 1/243; H01Q 1/245
See application file for complete search history.

(56) References Cited

U.S. PATENT DOCUMENTS

| | | | |
|---|---|---|---|
| 8,208,980 B2 | 6/2012 | Wong et al. | |
| 8,466,839 B2 | 6/2013 | Schlub et al. | |
| 9,030,373 B2 | 5/2015 | Sim | |
| 9,172,134 B2* | 10/2015 | McCaughey | H01Q 1/40 |
| 9,736,564 B2 | 8/2017 | Kurtz | |
| 10,090,875 B2* | 10/2018 | McCaughey | H01Q 7/00 |
| 10,306,030 B1* | 5/2019 | Zeng | H04M 1/026 |
| 2002/0097189 A1 | 7/2002 | Coloney | |
| 2003/0002691 A1 | 1/2003 | Ono et al. | |
| 2005/0090299 A1 | 4/2005 | Tsao et al. | |
| 2007/0036383 A1 | 2/2007 | Romero | |
| 2012/0265026 A1* | 10/2012 | Shenasa | G16H 40/63 600/301 |
| 2013/0099956 A1 | 4/2013 | Fratti | |
| 2013/0106661 A1* | 5/2013 | Xiang | H01Q 1/40 343/702 |
| 2013/0109435 A1* | 5/2013 | McCaughey | H01Q 1/40 455/556.1 |

(Continued)

OTHER PUBLICATIONS

Miclaus, S., Mihai, G., Aron, A. M. et al (2017). Shielding Efficiency of a Fabric Based on Amorphous Glass-covered Magnetic Microwires to Radiation Emitted by a Mobile Phone in 2G and 3G Communication Technologies. Land Forces Academy Review, vol. XXII, No. 4 (88), pp. 289-297. See Abstract; figure 1; and sections 1-4.

*Primary Examiner* — Tung X Le
(74) *Attorney, Agent, or Firm* — Holland & Hart LLP (57) ABSTRACT

An apparatus may include a protective screen overlay configured to couple with a screen of a wireless device. The protective screen overlay may be optically transparent. A conductive element is positioned in the protective screen overlay and configured to parasitically couple with an antenna of the wireless device when the antenna is energized. The conductive element may be optically transparent.

19 Claims, 5 Drawing Sheets

(56) References Cited

U.S. PATENT DOCUMENTS

| | | | |
|---|---|---|---|
| 2015/0011273 A1* | 1/2015 | Wilmhoff | H04M 1/00 455/575.7 |
| 2017/0264332 A1 | 9/2017 | Leibovich | |
| 2018/0310089 A1 | 10/2018 | Yun | |

* cited by examiner

PROTECTIVE SCREEN OVERLAY WITH ANTENNA ELEMENT

BACKGROUND

This disclosure relates generally to wireless devices such as mobile phones, digital assistants, electronic tablets, or other types of wireless devices, and specifically to protective overlays for such wireless devices. Radio frequency radiation from wireless devices may cause a health risk due to the amount of radiation that is proximate a user. Some are concerned that such radiation may cause burns, sickness, cancer, or damage to cells.

SUMMARY

In some embodiments, an apparatus may include a protective screen overlay configured to couple with a screen of a wireless device. The protective screen overlay may be optically transparent. A conductive element is positioned in the protective screen overlay and configured to parasitically couple with an antenna of the wireless device when the antenna is energized.

The conductive element may be positioned in the protective screen overlay that is optically transparent. The conductive element may be positioned in an edge of the protective screen overlay. The conductive element may be positioned in the protective screen overlay to be located over a bezel of the wireless device when the protective screen overlay is coupled with the screen.

The conductive element may be configured to reduce a specific absorption rate (SAR) experienced by a user of the wireless device when the wireless device is operational and the protective screen overlay is coupled with the wireless device. The conductive element may be configured to direct radio frequency energy away from a user of the wireless device. The conductive element may be configured to redistribute or disperse a localized RF "hotspot" or regions of an intense radio frequency field.

The antenna may be comprised of indium tin oxide, another transparent conducting oxide (TCO), a transparent conducting film, graphene, carbon nanotubes, or other two-dimensional conductive materials, or a combination thereof. The conductive element may be configured to inductively couple, or capacitively couple, or both with a second antenna of the wireless device configured to transmit or receive signals for the wireless device.

The apparatus may include a plurality of conductive elements configured to couple with the antenna of the wireless device at different frequencies, wherein a first conductive element of the plurality is configured to couple with the antenna over a first frequency spectrum band and a second conductive element of the plurality is configured to couple with the antenna over a second frequency spectrum band, wherein the plurality of conductive elements comprises the conductive element.

The plurality of conductive elements may be positioned in the protective screen overlay. The plurality of conductive elements may be positioned in a cover coupled with a side of the wireless device different than the screen of the wireless device. The plurality of conductive elements may be positioned in the protective screen overlay to couple with a second antenna of the wireless device. The antenna may be configured to improve a strength of a signal received or transmitted by a second antenna of the wireless device. The apparatus may include a second antenna positioned in the protective screen overlay and configured to cooperate with the antenna positioned in the protective screen overlay to reduce a SAR experienced by a user of the wireless device.

In some embodiments, a system may include a wireless device, a protective screen overlay configured to couple with a screen of the wireless device, the protective screen overlay is optically transparent, and a first antenna positioned in the protective screen overlay and configured to couple parasitically with a second antenna of the wireless device.

The first antenna may be configured to reduce a SAR experienced by a user of the wireless device when the user is holding the wireless device and the protective screen overlay is coupled with the screen of the wireless device. The first antenna positioned in the protective screen overlay may be optically transparent. The first antenna may be positioned in an edge of the protective screen overlay. The first antenna may be positioned in the protective screen overlay to be located over a bezel of the wireless device when the protective screen overlay is coupled with the screen.

In some embodiments, an apparatus may include a protective screen overlay configured to couple with a screen of a wireless device where the protective screen overlay is optically transparent and a first antenna positioned in the protective screen overlay and configured to couple parasitically with a second antenna of the wireless device. The first antenna may be configured to improve a strength of a signal received or transmitted by the second antenna of the wireless device.

In some embodiments, an apparatus may include a protective screen overlay configured to couple with a back of a wireless device where the protective screen overlay is optically transparent and a first antenna positioned in the protective screen overlay and configured to direct radio frequency energy away from a user of the wireless device to reduce a SAR experienced by the user of the wireless device.

DETAILED DESCRIPTION

Radio frequency radiation from phones or other types of wireless devices may be a health risk due to the amount of radiation that is proximate a user. At the same time, due to increased amounts of demand for more power and functionality in such wireless devices, full use of the available radio frequency is desirable for such devices. Wireless devices transmit radio frequency energy using a variety of wireless access technologies, such as 3G, 4G, 5G, Wi-Fi, Bluetooth®, or combinations thereof. The user may be exposed to potentially harmful radio frequency radiation for long periods of time from the wireless device's transmitter. Wireless devices held close to the head or body can expose the user to potentially harmful levels of radio frequency energy.

The apparatus and techniques described herein include a transparent overlay positionable over a display of a wireless device. The transparent overly may incorporate one or more embedded antenna elements to reduce the radio frequency radiation exposure of a wireless device.

The transparent overlay may be fully transparent or at least semi-transparent. The transparent overlay may be of any appropriate dimension to cover the display or screen of the wireless device and may adhere securely to the display's surface. In some cases, the transparent overlay does not interfere with the ability to view the contents of the display or the normal function of the display. Further, the transparent overlay may provide scratch and shatter protection to the display of the wireless device. In other examples, the transparent overlay with parasitic antenna elements can adhere to the rear of the wireless device.

The transparent overlay may be formed of a material that is electrically-insulating, optically transparent, or both. A non-exhaustive list of materials may include, but is not limited to, tempered glass, polyethylene terephthalate (PET) film, poly(methyl methacrylate) (PMMA) (e.g., plexiglass), plastic, other types of transparent materials, or combinations thereof. The material may form the substrate on which the electrically conductive antenna elements are plated or printed.

To allow unobstructed viewing of the screen of the wireless device, the antenna element may be formed of a material that is electrically-conductive, optically transparent, or both. The antenna elements may be at least mostly and/or semi-transparent. A non-exhaustive list of materials that may be used to constructive the conductive element may include, but is not limited to transparent conducting oxides (TCOs) such as indium tin oxide (ITO), transparent conducting polymers, carbon nanotubes (CNT), graphene, other types of materials, or combinations thereof. Alternatively or additionally, at least some portions of the antenna element may be opaque or semi-opaque. In these types of examples, the antenna elements may be formed of a material from the following non-exhaustive list of optically opaque conductive materials, such as plated or printed copper, nickel, silver, gold, other types of metals, other types of electrically conductive materials, or combinations thereof. The electrically conductive elements may be positioned around the frame or bezel of the viewable screen (or on the rear of the device).

The antenna elements may be positioned and/or tuned to capacitively and/or inductively couple with the cellular (e.g., 3G, 4G, or 5G), wireless local area network (WLAN) (e.g., Wi-Fi), or Bluetooth antenna or antennas of the wireless device. This may decrease the near field radio frequency radiation exposure from the wireless device when the wireless device is held next to the head or other parts of the user's body.

Figure 1:
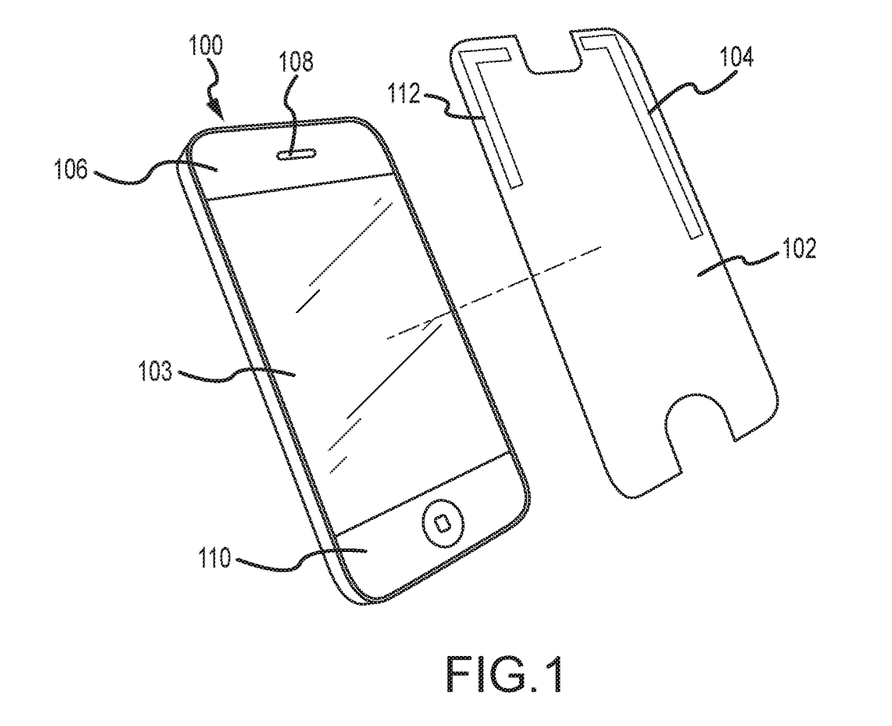
FIG. 1 illustrates an example of an exploded view of a wireless device and a protective screen overlay in accordance with aspects of the present disclosure.

FIG. 1 illustrates an example of an exploded view of a wireless device 100 and a protective screen overlay 102. The protective screen overlay 102 is sized and shaped to cover and/or surround the shape of a display 103 of the wireless device 100. A conductive element 104 may be incorporated into the protective screen overlay 102.

The wireless device 100 may include a display 103, an edge 106 (e.g., bezel), a speaker 108, and a button 110. The protective screen overlay 102 may cover at least a portion of the display 103. In the depicted example, the protective screen overlay 102 also covers a portion of the edge 106 of the wireless device 100.

The display 103 may include any appropriate type of display. In some examples, the display is merely a screen that depicts images, numbers, words, other types of symbols, or combinations thereof. In other examples, the display is a capacitive touch screen that reacts to the electrical stimulation of touch from a user's finger, another part of the user's body, a stylus, or another electrically conductive tool, or combinations thereof. In such examples, the protective screen overlay may be made of a material that can transmit the input from the user's finger, stylus, or other device to the capacitive touch screen so that the user can interact with the capacitive touch screen as though the protective screen overlay is not present. In other examples, the protective screen overlay covers a resistive touch screen where the resistive touch screen is malleable to be displaced to create an electrical contact under the display. In this example, the protective screen overlay 102 is flexible enough to move with the displacement of the resistive touch screen. In other examples, the protective screen overlay transmits ultrasonic energy such as from an in-screen fingerprint scanner/sensor so that the user can operate the sensor through the protective overlay.

The wireless device 100 may be an example of a wireless communication device, a phone, an electronic tablet, a digital assistant, a watch, another type of device, or combinations thereof. The wireless device 100 may transmit radio frequency energy using one or more radio frequency spectrum bands. The wireless energy may be transmitted with any appropriate of communication protocol in accordance with the principles described in the present disclosure. Such protocols may include standard wireless protocols, protocols used by Bluetooth® technologies, Wi-Fi protocols, Z-wave protocols, Zigbee protocols, other types of wireless protocols, 3G, 4G, 5G, or combinations thereof.

A conductive element 104 may be incorporated into the protective screen overlay 102. The conductive element 104 may be configured to affect the radio frequency radiation emitted from an internal antenna of the wireless device 100. In some cases, the conductive element 104 is positioned adjacent to the internal antenna that is housed within the wireless device 100. In other examples, the conductive element 104 is positioned away from the internal antenna housed in the wireless device 100. In some examples, the wireless device 100 may include multiple internal antennas. In some cases, the multiple conductive elements 104 in the protective screen overlay 102 may be used to collective affect the direction of the radio frequency energy. In other examples, a single conductive element 104 of the protective screen overlay 102 may be used to affect the combined signal from the multiple internal antennas of the wireless device 100. In other examples, multiple conductive elements 104 of the protective screen overlay 102 may be used to influence the signal from just a single internal antenna of the wireless device 100.

The protective screen overlay 102 may include a first conductive element 104 and a second conductive element 112. In this example, both the first and second conductive elements of the protective screen overlay 102 reside adjacent to the display 103 and also to the edge 106 of the wireless device 100.

Figure 2:
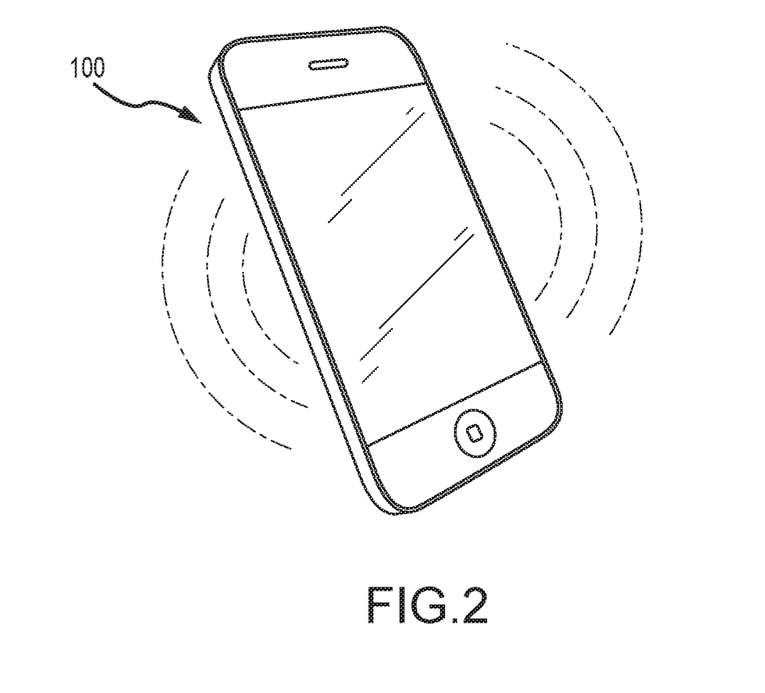
FIG. 2 illustrates an example of a wireless device without a protective screen overlay where the wireless device is broadcasting radio frequency energy in accordance with aspects of the present disclosure.

FIG. 2 illustrates an example of a wireless device 100 without a protective screen overlay (e.g., protective screen overlay 102 described with reference to FIG. 1), where the wireless device is broadcasting radio frequency energy. The radio frequency may be broadcast from an internal antenna (not shown) located inside the wireless device 100. In this example, the radio frequency radiation is broadcast substantially in all directions. Thus, in situations where wireless device 100 is held adjacent to an ear of a user, the radio frequency radiation is also transmitted in the direction of the user. In some examples, a level of radiation from the wireless device 100 may be unhealthy for the user.

Figure 3:
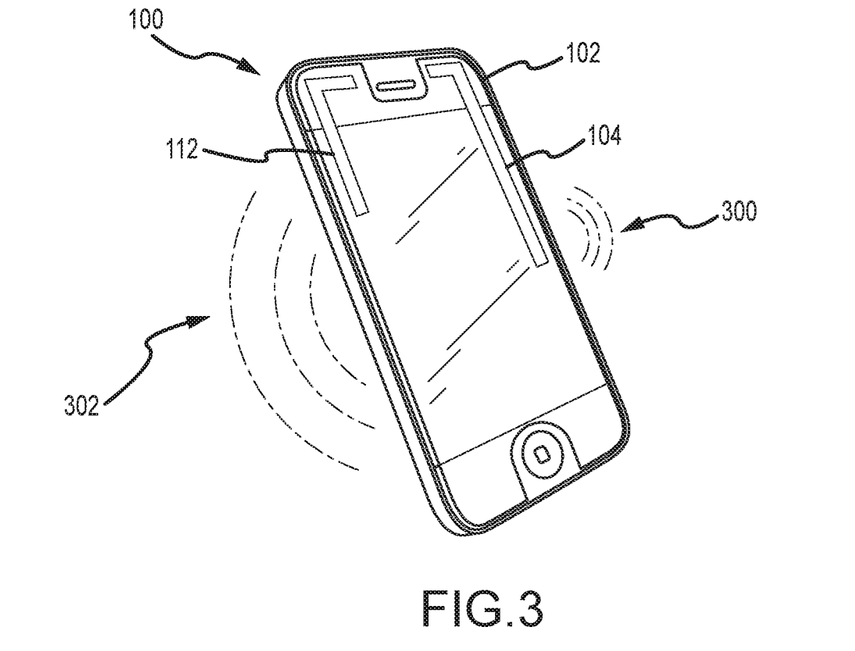
FIG. 3 illustrates an example of a wireless device and a protective screen overlay where the wireless device is broadcasting radio frequency energy in accordance with aspects of the present disclosure.

FIG. 3 illustrates an example of a wireless device 100 with a protective screen overlay 102, where the wireless device 100 is broadcasting radio frequency energy. In this example, the internal antenna of the wireless device 100 transmits the radio frequency radiation outwardly. The first and second conductive elements 104, 112 of the protective screen overlay 102 may be configured to affect the direction of the radio frequency. In this example, a portion of the radio frequency is minimized in a first direction 300 and redirected in a second direction 302. In some cases, the first direction 300 is a direction likely to advance towards the user when the user is holding the wireless device 100 near his or her ear, and the second direction 302 is a direction likely to go away from the user when the user is holding the wireless device 100 near his or her ear.

The first and second conductive elements 104, 112 of the protective screen overlay 102 may be configured to parasitically couple with the internal antenna of the wireless device 100 when the antenna is energized and directing radio frequency energy. The parasitic coupling may direct at least a portion of the radio frequency energy away from the user of the wireless device 100. The first and second conductive elements 104, 112 may be configured to reduce a specific absorption rate experienced by the user of the wireless device 100 when the wireless device 100 is held adjacent to the user's ear and the protective screen overlay 102 is coupled with the internal antenna of the wireless device 100.

Further, the first and second conductive elements 104, 112 may be configured to reduce a specific absorption rate experienced by the user of the wireless device 100 by at least 20 percent without adversely affecting a total radiation power of the wireless device 100 when the wireless device 100 is worn by the user and the protective screen overlay 102 is coupled with the wireless device 100. In other examples, the specific absorption rate may be reduced by at least 30 percent, by least 40 percent, by at least 50 percent, by at least 60 percent, by at least 70 percent, by at least 80 percent, by at least 90 percent, by at least another appropriate percentage, or combinations thereof.

At least one of the first and second conductive elements 104, 112 may be configured to inductively couple, capacitively couple, or both with the internal antenna of the wireless device 100. In some cases, at least one of the first and second the conductive elements 104, 112 is configured to improve a strength of a signal received or transmitted by the internal antenna of the wireless device 100.

At least one of the conductive elements 104, 112 of the protective screen overlay 102 may modify the radiation pattern of the radio waves emitted by the internal antenna of the wireless device 100, directing the waves in a beam in one direction thereby increasing the antenna's gain in that direction. At least one of the conductive elements 104, 112 may be a passive resonator that absorbs the radio waves from the internal antenna where at least one of the electrically conductive elements 104, 112 re-radiates the waves in a different phase. In such an example, the waves re-radiated from the conductive elements 104, 112 of the protective screen overlay 102 strengthen the antenna's radiation in a direction away from the user and cancel out at least a portion of the waves in a direction towards the user.

In some examples, at least one of the conductive elements 104, 112 may be configured to be oriented to have its length be transverse, aligned, substantially parallel, or parallel to the internal antenna of the wireless device 100. In some cases, at least a portion of at least one of the conductive elements 104, 112 is configured to be spaced apart from the internal antenna at a distance of less than an inch, less than half an inch, less than a quarter of an inch, less than a tenth of an inch, another appropriate length away from the internal antenna of the wireless device 100, or combinations thereof. In some cases, at least one of the conductive elements 104, 112 is at least 10 centimeters long in length, at least 25 centimeters long in length, at least 50 centimeters long in length, at least an inch long in length, at least 1.5 inches long in length, at least 2 inches long in length, at least 3 inches long in length, another length, or combinations thereof.

The internal antenna of the wireless device 100 may be a half-wave dipole where its length half a wavelength of the radio waves used. In these examples, at least one of the conductive elements 104, 112 (or the conductive elements 104, 112 combined) may be a reflector-type that is slightly longer (around 5%) than a half-wavelength. In this example, at least one of the conductive elements 104, 112 (or the conductive elements 104, 112 combined) may reflect the radio waves in the opposite direction. In another example, at least one of the conductive elements 104, 112 may be a director-type that is slightly shorter than a half-wavelength where the conductive element increases the radiation in a given direction. In some cases, the protective screen overlay 102 may include at least one conductive element that is a reflector-type conductive element that is positioned on one side of the internal antenna of the wireless device 100 and one or more director-type conductive elements on the other side of the wireless device 100.

In some examples, the first conductive element 104 in the protective screen overlay 102 is a director-type or a reflector-type, while the second conductive element 112 is the other. In this way, the first and second conductive elements 104, 112 may work together to influence the direction of the signal. In other examples, one or more conductive elements in the protective screen overlay 102 are a director-type or a reflector-type, while the other type of conductive element is located in a hard cover or anther protective overlay on the opposite side of the wireless device 100. In some cases, the more than one conductive elements incorporated into the protective screen overlay 102 are director-types. In yet another example, the more than one conductive elements incorporated into the protective screen overlay 102 are reflector-types. In some cases, a combination of reflector-type and director-type conductive elements are incorporated into the protective screen overlay 102 and/or a hard cover/protective overlay attached to an opposite side of the wireless device 100.

In examples where multiple conductive elements are incorporated into the protective screen overlay 102, the conductive elements may have the same shape and/or size. But, in other examples with multiple conductive elements incorporated into the protective screen overlay 102, at least two of the conductive elements include different sizes and/or shapes. In some cases with multiple conductive elements incorporated into the protective screen overlay 102, the locations of the conductive elements are generally symmetric with one conductive element on one side of a face of the wireless device 100 while the other conductive element is located on the other side of the face of the wireless device 100. Another example of symmetric positioning of the conductive elements includes having each of the conductive elements on the same side of the face of the wireless device 100. Yet, in other examples, the location of the first and second conductive elements may be asymmetric. An example of asymmetric positioning of the conductive elements may include locating one of the conductive elements in a mid-region of the face of the wireless device 100 and placing the other conductive element on a side of the face of the wireless device 100.

Figure 4:
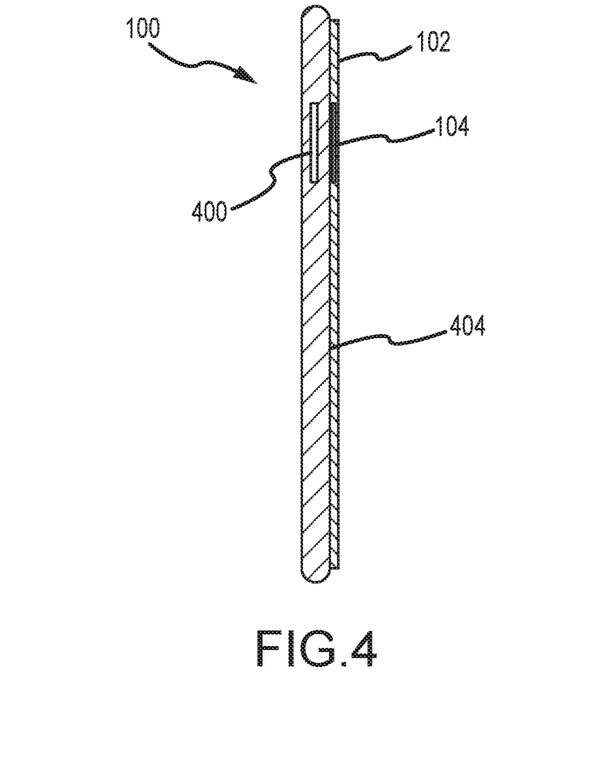
FIG. 4 illustrates an example of a cross sectional view of a wireless device and a protective screen overlay in accordance with aspects of the present disclosure.

FIG. 4 illustrates an example of a cross sectional view of a protective screen overlay 102 and the wireless device 100. In this example, the wireless device 100 includes an internal antenna 400 disposed within a portion of the wireless device 100. A protective screen overlay 102 is located adjacent to a front face 404 of the wireless device 100. A conductive element 104 is disposed within the protective screen overlay 102. The conductive element 104 may cooperatively work with the internal antenna 400 of the wireless device 100 to direct the radio frequency energy in a desired direction, such as a direction that is away from the user when the user has the wireless device 100 installed in his or her ear.

Figures 5A, 5B:
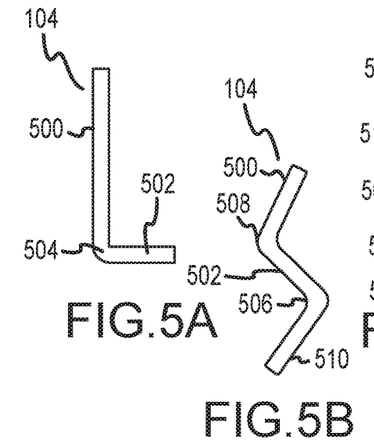
FIG. 5A illustrates an example of a conductive element in accordance with aspects of the present disclosure.
FIG. 5B illustrates an example of a conductive element in accordance with aspects of the present disclosure.

FIGS. 5A-F illustrate multiple examples of conductive elements 104. FIG. 5A illustrates an example of a conductive element 104 includes a first element portion 500 and a second element portion 502 that are connected at a bend 504. The bend 504 has an angle that is substantially 90 degrees. While this example has been depicted with a substantially 90 degree angle, any appropriate angle may be incorporated into the conductive element 104.

For example, the bend angle may be between 1 degree and 179 degrees. In some examples, the bend angle is between 25 degrees and 155 degrees. In another example, the bend angle may be between 50 degrees and 120 degrees. Additionally, in another example, the bend angle may be between 75 degrees and 110 degrees. The conductive element 104 of FIG. 5A generally resembles an "L-shape." In the illustrated example, the first element portion 500 is approximate twice as long as the second element portion 502.

FIG. 5B illustrates an example of a conductive element 104 that includes a first element portion 500, a second element portion 502, and a third element portion 506. The first element portion 500 may be connected to the second element portion 502 at a first bend 508, and the second element portion 502 may be connected to the third element portion 506 at a second bend 510. In the illustrated example, the first element portion 500 and the third element portion 506 are generally aligned, and the second element portion 502 is generally oriented in a direction that is transverse the first and third element portions 500, 506 of the conductive element 104. In this example, the first bend 508 has a bend angle that is less than 90 degrees. However, the first bend angle may be any appropriate angle. The second bend 510 includes a bend angle that is approximately 90 degree. However, in other examples, the second bend 510 may include any appropriate angle. In some examples, the angles of the first bend 508 and the second bend 510 are approximately the same. However, in other examples, the angles of the first bend 508 and the second bend 510 may be substantially different angles. In the example of FIG. 5B, the conductive element 104 generally resembles is a "Z-shape." In this example, the first element portion 500, the second element portion 502, and the third element portion 506 generally have the same length. However, in other examples, each of the first element portion 500, the second element portion 502, and the third element portion 506 may have different lengths.

Figures 5C, 5D, 5E, 5F:
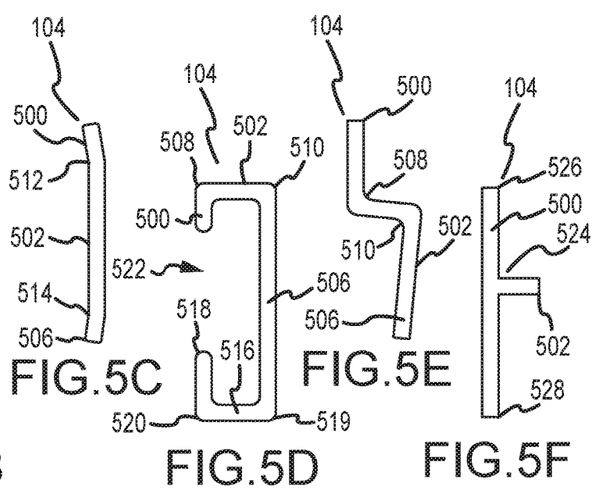
FIG. 5C illustrates an example of a conductive element in accordance with aspects of the present disclosure.
FIG. 5D illustrates an example of a conductive element in accordance with aspects of the present disclosure.
FIG. 5E illustrates an example of a conductive element in accordance with aspects of the present disclosure.
FIG. 5F illustrates an example of a conductive element in accordance with aspects of the present disclosure.

FIG. 5C illustrates an example of a conductive element 104 with a substantially linear shape. In this example, the conductive element 104 includes a first element portion 500, second element portion 502, and a third element portion 506. In this example, the conductive element 104 has a first slight bend 512 between the first element portion 500 and the second element portion 502. The conductive element 104 is also depicted with a second slight bend 514 between the second element portion 502 and the third element portion 506. In some examples, the conductive element 104 is a linear member without any slight or major bends.

FIG. 5D illustrates an example of a conductive element 104 that includes a first element portion 500, a second element portion 502, a third element portion 506, a fourth element portion 516, and a fifth element portion 518. The first element portion 500 may be connected to the second element portion 502 at a first bend 508, and the second element portion 502 may be connected to the third element portion 506 at a second bend 510. The third element portion 506 may be connected to the fourth element portion 516 at a third bend 519, and the fourth element portion 516 may be connected to the fifth element portion 518.

In some examples, the first bend 508, the second bend 510, the third bend 519, and/or the fourth bend 520 may have a substantially 90 degree angles. In other examples, at least two of the first bend 508, the second bend 510, the third bend 519, and/or the fourth bend 520 have different angles. While this example depicts the bends as having 90 degree angles, the bends may individually include any appropriate angle. In the illustrated example of FIG. 5D, the conductive element 104 generally resembles a "C-shape." In this example, the first element portion 500, the third element portion 506, and the fifth element portion 518 are aligned with each other, while the second element portion 502 and the fourth element portion 516 are aligned with each other. In this example, the first element portion 500 and the fifth element portion 518 generally extend towards each other, but are separated with a gap 522.

FIG. 5E illustrates an example of a conductive element 104 that includes a first element portion 500, a second element portion 502, and a third element portion 506. The first element portion 500 may be connected to the second element portion 502 at a first bend 508, and the second element portion 502 may be connected to the third element portion 506 at a second bend 510. In the illustrated example, the first element portion 500 and the third element portion 506 are generally aligned, and the second element portion 502 is generally oriented in a direction that is transverse the first and third element portions 500, 506 of the conductive element 104. In this example, the first bend 508 has a bend angle that is less than 90 degrees. However, the first bend angle may be any appropriate angle. The second bend 510 includes a bend angle that is approximately 90 degree. However, in other examples, the second bend 510 may include any appropriate angle. In some examples, the angles of the first bend 508 and the second bend 510 are approximately the same. However, in other examples, the angles of the first bend 508 and the second bend 510 may be substantially different angles. In the example of FIG. 5E, the conductive element 104 generally resembles is a "step-shape." In this example, the first element portion 500 is approximately twice as long as the third element portion 506.

FIG. 5F illustrates an example of a conductive element 104 that includes a first element portion 500 and a second element portion 502. The second element portion 502 is connected to a midsection 524 of the first element portion 500 at a 90 degree angle. In this example, the second element portion 502 may be an electrically conductive protrusion. In alternative examples, additional electrically conductive protrusions may be attached to the midsection 524 of the first element portion 500. In yet other examples, at least one electrically conductive protrusions may be connected to multiple portions of the conductive element 104. For example, at least one electrically conductive protrusion may be connected to any of the first, second, third, fourth, or fifth element portions of any of the examples depicted in FIGS. 5A-5F.

In some examples, the electrically conductive protrusions may be connected to the midsection 524 of the appropriate element portion at an angle other than 90 degrees. For example, the electrically conductive protrusions may be connected to the midsections 524 at an angle between 1 degree and 90 degrees. In another example, the electrically conductive protrusion may be connected at an angle between 10 degrees and 80 degrees. In yet another example, the electrically conductive protrusions may be connected to a midsection 524 at an angle between 20 degrees and 70 degrees. Furthermore, in another example, the electrically conductive protrusions may be connected to the midsections 524 at an angle between 30 degrees and 60 degrees. In another example, the electrically conductive protrusion may be connected to the midsection 524 at an angle between 40 degrees and 50 degrees. The midsection 524 may span between the first end 526 of the element portion and a second end 528 of the element portion that is opposite the first end of the element portion.

In some examples, the electrically conductive protrusion may be connected in approximately the center of the element section, while in other examples, the electrically conductive protrusion is connected near either the first end or the second end of the element portion. While the electrically conductive protrusion has been described as attaching to the element portion at certain locations, the electrically conductive protrusion may be attached to any appropriate location along the length of the element portion.

Figures 6A, 6B:
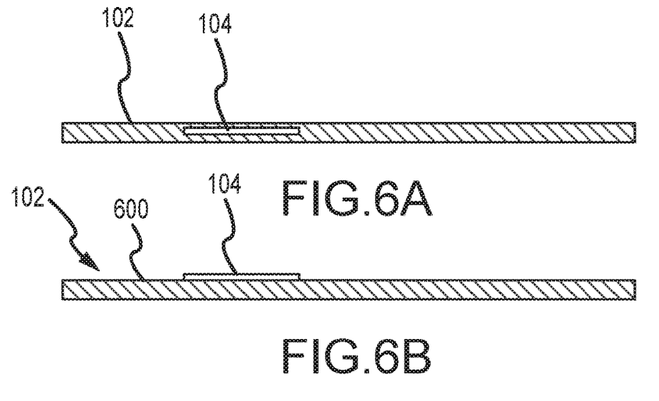
FIG. 6A illustrates an example of a cross-sectional view of a protective screen overlay with an embedded conductive element in accordance with aspects of the present disclosure.
FIG. 6B illustrates an example of a cross-sectional view of a protective screen overlay with a conductive element affixed to a surface of the protective screen overlay in accordance with aspects of the present disclosure.

FIGS. 6A and 6B illustrate examples of cross-sectional views of the protective screen overlay 102. In the example of FIG. 6A, the conductive element 104 is embedded within the thickness of the protective screen overlay 102. In such an example, the conductive element may be located internally to the protective screen overlay 102. This construction may be made by molding the material of the protective screen overlay 102 around the conductive element 104.

In the example of FIG. 6B, the conductive element 104 may be affixed to an outer surface 600 of the protective screen overlay 102. In some examples, the conductive element 104 is adhered, glued, attached, deposited, printed, or otherwise affixed to the outer surface 600 of the protective screen overlay 102.

Figures 7A, 7B:
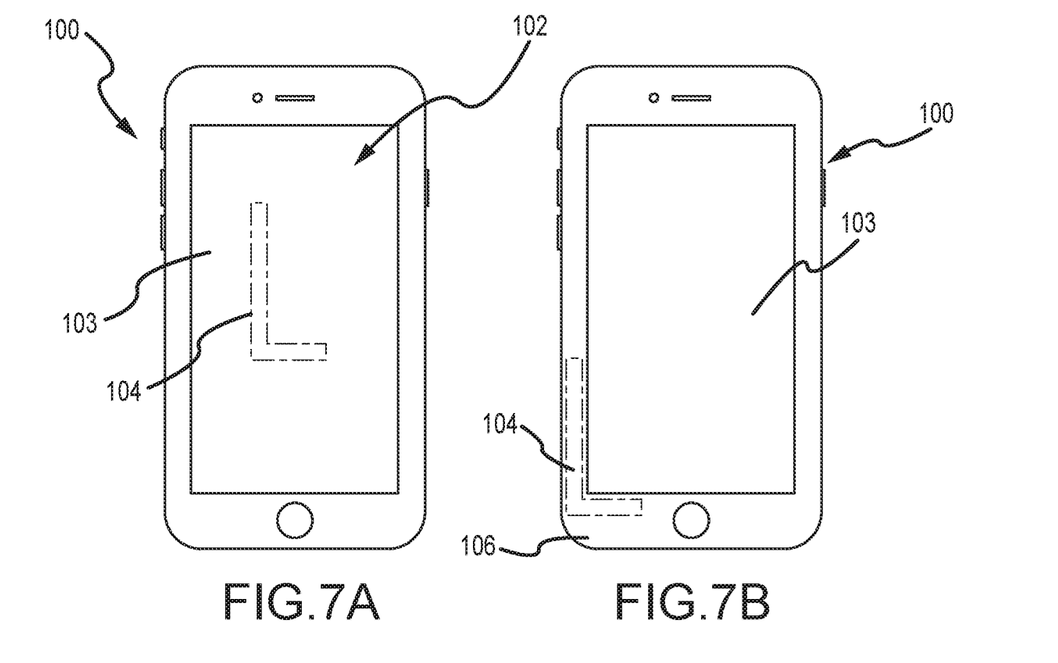
FIG. 7A illustrates an example of a position of a conductive element in a protective display overlay in relation to a screen of a wireless device in accordance with aspects of the present disclosure.
FIG. 7B illustrates an example of a position of a conductive element in a protective display overlay in relation to a screen of a wireless device in accordance with aspects of the present disclosure.

FIG. 7A illustrates an example of a position of the conductive element 104 in the protective screen overlay 102 in relation to a display 103 of the wireless device 100. The conductive element 104 of the protective screen overlay 102 may be located over the display 103 of the wireless device 100. In this example, the conductive element 104 may be transparent or at least semi-transparent so that the user has a full view of the content in the display 103.

In some examples, the conductive element 104 is made of at least one trace of electrically conductive material that is thin enough that the trace is difficult to see with the naked eye so that the conductive element 104 is transparent to the user. In other examples, the conductive element 104 is made of a transparent material.

FIG. 7B illustrates an example of a position of the conductive element 104 in the protective screen overlay 102 in relation to a display 103 of the wireless device 100. The conductive element 104 may be located over an edge 106 of the wireless device 100. In some cases, the edge 106 may be an example of a bezel of the wireless device 100 a frame of the wireless device 100, a curved portion of the display 103, or a combination thereof. With the conductive element 104 located off the display 103 over the edge 106, the conductive element 104 may still be transparent due to size or being made of a transparent material. However, in other examples, the conductive element 104 may be opaque or semi-opaque regardless of whether the conductive element is located over a display or bezel portion of the face of the wireless device 100.

Figure 8:
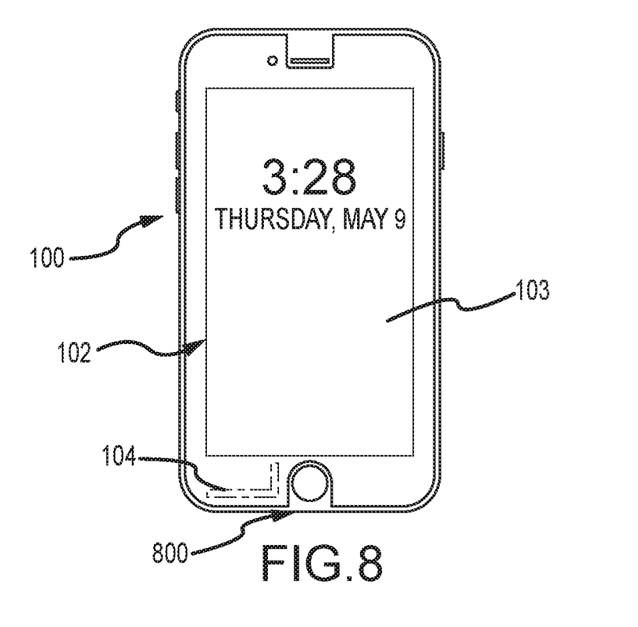
FIG. 8 illustrates an example of a position of a conductive element in a protective screen overlay in relation to a screen of a wireless device in accordance with aspects of the present disclosure.

FIG. 8 illustrates an example of a position of the conductive element 104 in the protective screen overlay 102 in relation to a display 103 of the wireless device 100. In such an example, the conductive element 104 may be located off of the display 103 of the face of the wireless device 100. The conductive element 104 may be located adjacent a cutout 800 of the protective screen overlay 102.

Figure 9:
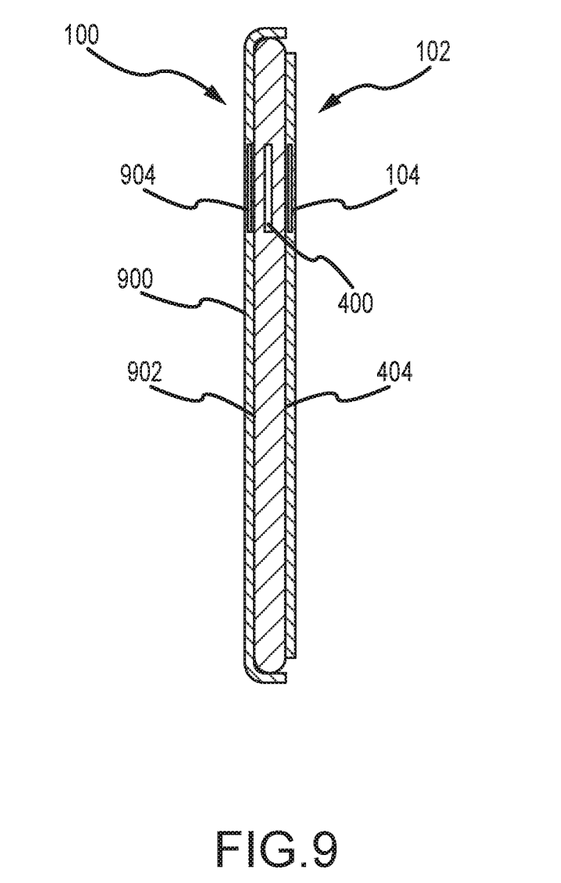
FIG. 9 illustrates an example of a cross sectional view of wireless device with a hard cover and a protective screen overlay in accordance with aspects of the present disclosure.

FIG. 9 illustrates an example of a cross sectional view of a wireless device 100 with a hard cover 900 attached to a backside 902 of the wireless device 100, and a protective screen overlay 102 attached to a front face 404 of the wireless device 100. The wireless device 100 includes an internal antenna 400 configured to broadcast the radio frequency energy. The protective screen overlay 102 includes a conductive element 104 to affect the radio frequency energy from the internal antenna 400 of the wireless device 100. The hard cover 900 also includes second conductive element 904 to affect the radio frequency energy of the wireless device 100. In some cases, the second conductive element 904 is a reflector-type while the conductive element 104 of the protective screen overlay 102 is a director-type or vice versa. In some cases, the conductive element 104 of the protective screen overlay 102 and the second conductive element 904 are either both director-types or both reflector-types. In some examples, the conductive element 104 of the protective screen overlay 102 and the second conductive element 904 work cooperatively to influence the direction of the radio frequency energy.

While the examples above depict certain types of wireless devices, protective screen overlays, hard covers, and so forth, any appropriate type of wireless devices, protective screen overlays, hard covers may be used in accordance with the principles described in this disclosure. Further, while the conductive elements have been described in this disclosure with certain shapes and sizes, any appropriate type of cover may be used in accordance with the principles described herein to parasitically couple with an internal antenna of the wireless device.

As used herein, the term "aligned" may mean parallel, substantially parallel, or forming an angle of less than 35.0 degrees. As used herein, the term "transverse" may mean perpendicular, substantially perpendicular, or forming an angle between 55.0 and 125.0 degrees. As used herein, the term "length" may mean the longest dimension of an object. As used herein, the term "width" may mean the dimension of an object from side to side. In some cases, the width of an object is orthogonal or transverse to the object's length.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed

What is claimed:

1. An apparatus, comprising:
   a protective screen overlay configured to couple with a screen of a wireless device, the protective screen overlay is optically transparent; and
   a conductive element positioned in the protective screen overlay, the conductive element configured to parasitically couple with an antenna of the wireless device when the antenna is energized and affect a direction of radio frequency energy transmitted or received by the antenna of the wireless device, wherein the conductive element positioned in the protective screen overlay is at least partially optically transparent.

2. The apparatus of claim 1, wherein the conductive element is positioned in an edge of the protective screen overlay.

3. The apparatus of claim 1, wherein the conductive element is positioned in the protective screen overlay to be located over a bezel of the wireless device when the protective screen overlay is coupled with the screen.

4. The apparatus of claim 1, wherein the conductive element is configured to reduce a specific absorption rate (SAR) experienced by a user of the wireless device when the wireless device is operational and the protective screen overlay is coupled with the wireless device.

5. The apparatus of claim 1, wherein the conductive element is configured to direct radio frequency energy away from a user of the wireless device.

6. The apparatus of claim 1, wherein the antenna is comprised of indium tin oxide, another transparent conducting oxide (TCO), a transparent conducting film, graphene, carbon nanotubes, or other two-dimensional conductive materials, or a combination thereof.

7. The apparatus of claim 1, wherein the conductive element is configured to inductively couple, or capacitively couple, or both with a second antenna of the wireless device configured to transmit or receive signals for the wireless device.

8. The apparatus of claim 1, wherein the antenna is configured to improve a strength of a signal received or transmitted by a second antenna of the wireless device.

9. The apparatus of claim 1, further comprising:
   a second antenna positioned in the protective screen overlay and configured to cooperate with the antenna positioned in the protective screen overlay to reduce a specific absorption rate (SAR) experienced by a user of the wireless device.

10. An apparatus, comprising:
    a protective screen overlay configured to couple with a screen of a wireless device, the protective screen overlay is optically transparent;
    a conductive element positioned in the protective screen overlay and configured to parasitically couple with an antenna of the wireless device when the antenna is energized; and
    a plurality of conductive elements configured to couple with the antenna of the wireless device at different frequencies, wherein a first conductive element of the plurality is configured to couple with the antenna over a first frequency spectrum band and a second conductive element of the plurality is configured to couple with the antenna over a second frequency spectrum band, wherein the plurality of conductive elements comprises the conductive element.

11. The apparatus of claim 10, wherein the plurality of conductive elements are positioned in the protective screen overlay.

12. The apparatus of claim 10, wherein the plurality of conductive elements are positioned in a cover coupled with a side of the wireless device different than the screen of the wireless device.

13. The apparatus of claim 10, wherein the plurality of conductive elements are positioned in the protective screen overlay to couple with a second antenna of the wireless device.

14. A system, comprising:
  a wireless device;
  a protective screen overlay configured to couple with a screen of the wireless device, the protective screen overlay is optically transparent; and
  a first antenna positioned in the protective screen overlay, the first antenna configured to parasitically couple with an antenna of the wireless device when the antenna is energized and affect a direction of radio frequency energy transmitted or received by the antenna of the wireless device, wherein the first antenna positioned in the protective screen overlay is at least partially optically transparent.

15. The system of claim 14, wherein the first antenna is configured to reduce a specific absorption rate (SAR) experienced by a user of the wireless device when the user is holding the wireless device and the protective screen overlay is coupled with the screen of the wireless device.

16. The system of claim 14, wherein the first antenna is positioned in an edge of the protective screen overlay.

17. The system of claim 14, wherein the first antenna is positioned in the protective screen overlay to be located over a bezel of the wireless device when the protective screen overlay is coupled with the screen.

18. An apparatus, comprising:
  a protective screen overlay configured to couple with a screen of a wireless device, the protective screen overlay is optically transparent; and
  a first antenna positioned in the protective screen overlay, the first antenna configured to couple parasitically with a second antenna of the wireless device and affect a direction of radio frequency energy transmitted or received by the second antenna of the wireless device, wherein the first antenna positioned in the protective screen overlay is at least partially optically transparent;
  wherein the first antenna is configured to improve a strength of a signal received or transmitted by the second antenna of the wireless device.

19. An apparatus, comprising:
  a protective screen overlay configured to couple with a back of a wireless device, the protective screen overlay is optically transparent; and
  a first antenna positioned in the protective screen overlay, the first antenna configured to affect a direction of radio frequency energy transmitted or received by an antenna of the wireless device and direct radio frequency energy away from a user of the wireless device to reduce a specific absorption rate (SAR) experienced by the user of the wireless device, wherein the first antenna positioned in the protective screen overlay is at least partially optically transparent.

* * * * *